(12) United States Patent
Vienot et al.

(10) Patent No.: US 8,851,794 B2
(45) Date of Patent: *Oct. 7, 2014

(54) METHODS AND SYSTEMS FOR SULFUR DISPOSAL

(75) Inventors: Michael E. Vienot, Glenview, IL (US); Lee Chin, Houston, TX (US)

(73) Assignee: ConocoPhillips Company, Houston, TX (US)

(*) Notice: Subject to any disclaimer, the term of this patent is extended or adjusted under 35 U.S.C. 154(b) by 96 days.

This patent is subject to a terminal disclaimer.

(21) Appl. No.: 13/179,021

(22) Filed: Jul. 8, 2011

(65) Prior Publication Data

US 2012/0022313 A1    Jan. 26, 2012

Related U.S. Application Data

(60) Provisional application No. 61/412,443, filed on Nov. 11, 2010, provisional application No. 61/366,789, filed on Jul. 22, 2010.

(51) Int. Cl.
- *B01B 1/00*  (2006.01)
- *C01B 17/02* (2006.01)
- *B01J 2/04*  (2006.01)

(52) U.S. Cl.
CPC .............. *B01J 2/04* (2013.01); *C01B 17/0237* (2013.01); *C01B 17/0216* (2013.01)
USPC .................................................. 405/129.35

(58) Field of Classification Search
USPC .................................................. 405/129.35
See application file for complete search history.

(56) References Cited

U.S. PATENT DOCUMENTS

| | | |
|---|---|---|
| 3,295,950 A | 1/1967 | Blouin et al. |
| 3,318,666 A | 5/1967 | Every et al. |
| 3,965,067 A | 6/1976 | Jin |
| 4,024,210 A | 5/1977 | Chalmers |
| 4,151,234 A | 4/1979 | Schofield |
| 4,394,150 A | 7/1983 | Garrison, Jr. et al. |
| 4,497,635 A | 2/1985 | Blackwood |
| 4,923,482 A | 5/1990 | Menar |
| 5,460,765 A | 10/1995 | Derdall et al. |
| 5,475,059 A | 12/1995 | Brands |
| 6,228,905 B1 | 5/2001 | Soderberg et al. |

(Continued)

OTHER PUBLICATIONS

Bill Hannemann, Larry Hopper and Jim Molnar, "Molten Sulphur Transport Review and Current Thoughts", 5 pages.

(Continued)

*Primary Examiner* — John Kreck
(74) *Attorney, Agent, or Firm* — ConocoPhillips Company

(57) ABSTRACT

Methods and systems are provided for sulfur disposal through preparation of a micro-sized sulfur slurries. Micro-sized sulfur slurries are created for downhole disposal by forming sulfur particulates, which are then combined with a carrier fluid. The micro-sized sulfur slurries may be introduced to a subterranean formation, in some cases, to an unconsolidated sand formation by way of a dilation mechanism. Some embodiments comprise forming micro-sized sulfur slurries through a conversion process that converts molten sulfur to powder sulfur by gas cooling of atomized sprays of molten sulfur. Advantages of the embodiments disclosed herein as compared to many conventional methods include higher efficiencies, lower cost, and enhanced disposal of sulfur material. Furthermore, forming a micro-sized sulfur slurry allows for a more convenient form of transport. Additionally, high sulfur loading rates may be achieved, ultimately allowing for more economical sulfur transport.

16 Claims, 1 Drawing Sheet

(56) References Cited

U.S. PATENT DOCUMENTS

| | | |
|---|---|---|
| 6,555,087 B2 | 4/2003 | Pascual et al. |
| 6,582,025 B2 | 6/2003 | Pickren |
| 6,672,798 B2 | 1/2004 | Pickren |
| 7,097,392 B2 | 8/2006 | Stecher |
| 7,226,572 B1 | 6/2007 | Keller et al. |
| 7,533,719 B2 | 5/2009 | Hinson et al. |
| 7,631,689 B2 | 12/2009 | Vinegar et al. |
| 8,444,887 B2 * | 5/2013 | Vienot et al. .................. 264/13 |
| 2006/0043002 A1 | 3/2006 | Petrinec et al. |
| 2007/0251686 A1 | 11/2007 | Sivrikoz et al. |
| 2009/0200018 A1 | 8/2009 | Sivrikoz et al. |
| 2009/0241803 A1 | 10/2009 | Mahmoudkhani et al. |

OTHER PUBLICATIONS

L.Y. Chin and C.T. Montgomery, "A Numerical Model for Simulating Solid Waste Injection in Soft Rock Reservoirs", SPE 90507, 2004, Society of Petroleum Engineering, Inc., 14 pages.

* cited by examiner

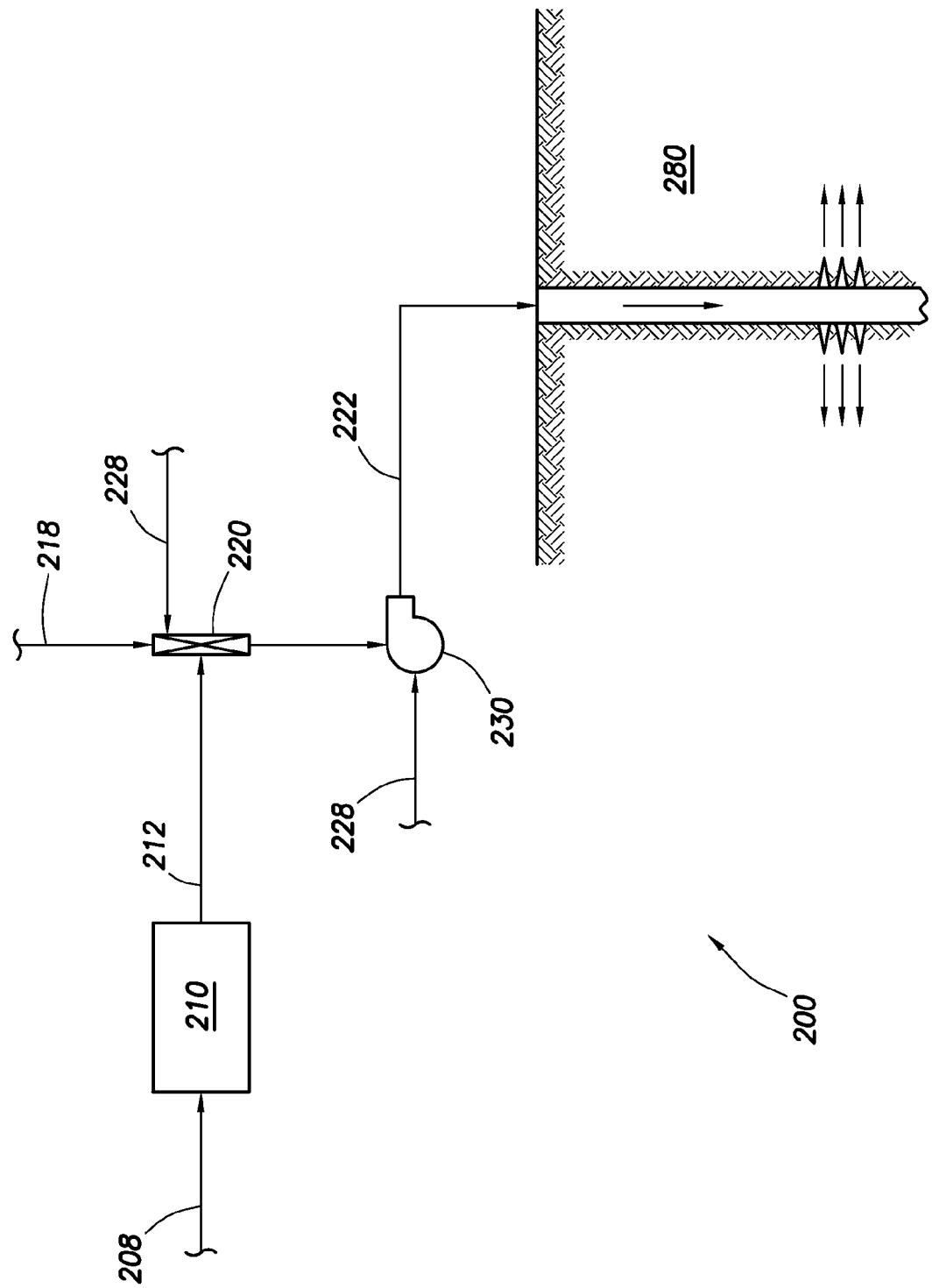

METHODS AND SYSTEMS FOR SULFUR DISPOSAL

CROSS-REFERENCE TO RELATED APPLICATIONS

This application is a non-provisional application which claims the benefit of and priority to U.S. Provisional Application Ser. No. 61/412,443 filed Nov. 11, 2010, entitled "Methods and Systems for Sulfur Disposal," and U.S. Provisional Application Ser. No. 61/366,789 filed Jul. 22, 2010, entitled "Methods and Systems for Conversion of Molten Sulfur to Powder Sulfur," both of which are hereby incorporated by reference in their entirety.

FIELD OF THE INVENTION

The present invention relates generally to methods and systems for the disposal of sulfur. More particularly, but not by way of limitation, embodiments of the present invention include methods and systems for sulfur disposal through preparation of a micro-sized sulfur slurry.

BACKGROUND

Millions of metric tons of elemental sulfur are produced each year, primarily as a by-product of natural gas production, petroleum refining, and native sulfur mining industries. Sulfur is also produced as a by-product in coal-fired power plant operations, tar sands development, and in any industrial process that reduces the sulfur level in fuels or effluents for the purpose of complying with air quality standards.

In some cases, the sulfur content of naturally occurring hydrocarbons may be as high as 15 vol % or even higher. The presence of sulfur compounds in hydrocarbons is typically highly undesirable, because sulfur compounds are usually extremely harmful, even lethal, to breathe. Moreover, sulfur compounds can be extremely corrosive.

Sulfur compounds recovered from extracted hydrocarbons may take many forms. In some cases, the recovered sulfur compounds are already in the form of elemental sulfur, while in other cases, the sulfur compounds are converted to elemental sulfur for disposal or delivery. In still other cases, the sulfur compounds may be converted to other useful sulfur-based compounds such as sulfuric acid by a WSA Process unit.

Hydrogen sulfide is one example of a common sulfur compound found in naturally-occurring hydrocarbons. Hydrogen sulfide has an extreme acute toxicity, flammability, noxious odor, insidious odor sensory depression, and corrosiveness. In part for these reasons, almost all of the hydrogen sulfide is converted to elemental sulfur and water at or near the site where the hydrogen sulfide is produced.

Because the presence sulfur compounds in extracted hydrocarbon is highly undesirable, hydrocarbon producers usually endeavor to treat produced hydrocarbons to remove sulfur compounds such as hydrogen sulfide to acceptable levels. Indeed, processing hydrocarbons to remove sulfur compounds is an instrumental part of the hydrocarbon production value chain.

The sulfur compounds recovered from hydrocarbons are either disposed of or transported for end use by others. Typically, the primary sulfur compound recovered from hydrocarbons is elemental sulfur. A continuing challenge in the industry is the transportation or disposal of this elemental sulfur. The refining process which produces elemental sulfur usually produces elemental sulfur in the form of molten sulfur. Thus, one is often faced with the challenge of transporting or disposing of molten sulfur or converting the molten sulfur to some bulk solid sulfur for transportation or disposal. The handling of both forms of elemental sulfur, i.e. molten sulfur and bulk solid sulfur, present significant complications.

Transporting molten sulfur itself without converting it to solid form presents a number of challenges. Proper storage methods are required to ensure the sulfur is not contaminated, that it does not damage equipment (e.g. corrosion, fires), and that it does not harm the environment. Transporting sulfur in molten form requires maintaining its temperature at above approximately 115° C. (~240° F.). While transport over short distances can be done in well insulated containers, over longer distances, a heating system is required to maintain the sulfur in the liquid state. Molten sulfur must be handled and stored within a relatively narrow range of temperatures. Too hot and the sulfur viscosity rises quickly and the sulfur cannot be pumped. Too cold and the sulfur will solidify. Once solidified in a storage vessel, the sulfur is difficult to liquefy again due to the low thermal conductivity of solid sulfur. Because molten sulfur is inherently hazardous, systems for transporting molten sulfur involve higher cost to provide the required containment. Moreover, insulation and/or heating mechanisms must be provided during transport to preserve the molten sulfur in its molten state, which necessarily adds additional costs. A tank car that has just carried molten sulfur cannot be easily cleaned so that the trailer can carry a different commodity on the return trip or to another destination. The result is that the tank car is usually full on the delivery trip but is empty on the return trip. Larger quantities of molten sulfur may also be transported by rail or by water vessels, but the same transport challenges remain. At the destination, additional heating such as by steam may need to be provided to melt away any sulfur that may have solidified during transport. For all of these reasons, handling molten sulfur, either for transportation or for disposal, is beset with a multitude of difficulties and is generally a disfavored method of transporting and/or disposing of sulfur.

Thus, the majority of sulfur around the world is transported as a bulk solid. The sulfur is often stored in the open in huge stockpiles at terminals ready to be loaded onto ships, railcars or truck or at plant sites to be melted and used in the production of sulfuric acid.

Bulk sulfur may be produced from sulfur that has been crushed from larger pieces. Another form of sulfur, slate sulfur, is formed by pouring molten sulfur on a moving belt where it is solidified into a continuous slab with a thickness of 3 to 5 mm. The sulfur begins to break into smaller pieces when it is separated from the belt and when the sulfur is discharged from the belt at the head pulley. This process produces irregular shaped pieces with sharp edges.

Granulated sulfur is produced by spray coating sulfur particles to increase their size to produce dense spherical solid granules. Small seed particles of sulfur are introduced at the feed end of a rotating drum. The particles are spray coated with molten sulfur as the particles move down the drum towards the discharge. Each layer of molten sulfur that is applied is cooled to solidification before the next coat is applied. Through repeated application of sulfur layers, a granule size of 1 to 6 mm diameter is produced. Fines are minimal at the production stage and the round shape of the granule resist further degradation to fines.

The WetPrill™ process involves pumping molten sulfur onto a perforated plate. The sulfur flows through the perforations in the form of droplets. The droplets fall into an agitated water bath which solidifies and cools the sulfur into pellets. The pellets are separated from the water in dewatering screens.

While industrial chemicals and commodities can be transported long distances by pipeline, in many cases more economically than by rail or other forms of shipment, pipeline transfer has not been used for sulfur or at most, for only short distances. This lack of use is due in part to the high melting point of sulfur, the corrosiveness of sulfur when dissolved in typical solvents or when in contact with air or moisture, and the tendency of sulfur to precipitate from solution. When shipped as a solution or slurry, sulfur tends to deposit on the pipeline walls, resulting in plating, plugging, and line blocking, all of which lead to unreliability, high maintenance, and excessive power consumption.

The storage and disposal of sulfur pose challenges as well, particularly those arising from environmental concerns. Disposal in an environmentally sound yet economical manner is achievable, but at significant expense. Disposal currently consists of converting molten sulfur to solid blocks for aboveground storage, injecting sulfur as acid gas into geologic formations, or oxidizing hydrogen sulfide to sulfur oxides and injecting the sulfur oxides underground for storage. Sulfur disposal as acid gas involves significant injection pressures accompanied by systems mechanical integrity risks. Whereas above ground storage requires a significant environmental footprint and appropriate handling equipment both for the pour and block systems and the recovery of solid sulfur for future sale. Underground fluid injection into existing storage caverns is capital intensive and requires unique geologic conditions.

Thus, conventional methods suffer from a variety of disadvantages, including high cost, inefficiency, and substantial transportation/disposal complications. Accordingly, there is a need in the art for enhanced systems and methods that address one or more disadvantages of the prior art.

SUMMARY

The present invention relates generally to methods and systems for the disposal of sulfur. More particularly, but not by way of limitation, embodiments of the present invention include methods and systems for sulfur disposal through preparation of a micro-sized sulfur slurry.

One example of a sulfur disposal method for disposing of sulfur in an unconsolidated sand formation comprises the steps of: receiving sulfur; reducing the sulfur to sulfur particulates from about 1 to about 10 microns; preparing an aqueous sulfur slurry comprising a carrier fluid and the sulfur particulates, wherein the carrier fluid comprises water; disposing of the aqueous sulfur slurry downhole; introducing the aqueous sulfur slurry to the unconsolidated sand formation; and allowing the aqueous sulfur slurry to diffuse throughout the unconsolidated sand formation wherein the aqueous sulfur slurry occupies and permeates through the unconsolidated sand formation by way of a dilation mechanism.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 1 illustrates a process for disposing of sulfur in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for the disposal of sulfur. More particularly, but not by way of limitation, embodiments of the present invention include methods and systems for sulfur disposal through preparation of a micro-sized sulfur slurry.

In certain embodiments, a micro-sized sulfur slurry is created for downhole disposal by forming sulfur particulates, which are then combined with a carrier fluid. The micro-sized sulfur slurry is introduced to a subterranean formation. In some cases, the micro-sized sulfur slurry diffuses throughout an unconsolidated sand formation by way of a dilation mechanism. Some embodiments comprise forming micro-sized sulfur slurry slurries through a conversion process that converts molten sulfur to powder sulfur by gas cooling of atomized sprays of molten sulfur.

Advantages of the embodiments disclosed herein as compared to many conventional methods include, but are not limited to, higher efficiencies, lower cost, and enhanced disposal of sulfur material. Furthermore, forming a micro-sized sulfur slurry allows for a much more convenient form of transport. Where the sulfur powder is mixed into a slurry, high loading rates of sulfur powder may be achieved in some embodiments, ultimately allowing for more economical sulfur transport.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a process for disposing of sulfur in accordance with one embodiment of the present invention. System 200 produces a micro-sized sulfur slurry for disposing of sulfur. Sulfur 208 is fed to sulfur reduction unit 210 for reducing sulfur 208 to sulfur particulates 212. In certain embodiments, sulfur 208 comprises a molten sulfur and in other embodiments, sulfur 208 comprises solid sulfur in bulk. Sulfur reduction unit 210 may reduce sulfur 208 by any means known in the art for reducing sulfur to a plurality of particulates, including, but not limited to, milling processes, colloidal mill processes, prilling processes, or any combination thereof. In certain embodiments, sulfur reduction unit 210 may comprise any one of the sulfur reduction methods disclosed in the patent application, "Methods and Systems for Conversion of Molten Sulfur to Powder Sulfur," filed Jul. 22, 2010 (U.S. Ser. No. 61/366,789), including gas cooling of atomized sprays of molten sulfur to produce sulfur powder.

U.S. provisional patent application Ser. No. 61/366,789, filed Jul. 22, 2010 is hereby incorporated by reference for all purposes.

The sulfur particulates may be sized for optimal loading rates into a slurry. Often, it is desired to maximize the amount of sulfur dissolved in a carrier fluid without experiencing undesirable precipitation of the sulfur from the carrier fluid. In certain embodiments, sulfur powder may be formed that comprises fine sulfur particulates from about 1 micron to about 10 microns in diameter. Certain preferred embodiments will form sulfur particulates from about 1 micron to about 3 microns in diameter. Still other embodiments will form sulfur particulates about 2 microns in diameter.

In certain embodiments, the sulfur powder formed may have a variable particulate size distribution having an average size from about 1 micron to about 10 microns, from about 1 micron to about 3 microns, or less than about 2 microns, or about 2 microns. In certain embodiments, the particulate size is sufficiently small to permit high sulfur loading rates of about 1 to about 6 pounds of sulfur powder per gallon of water.

To form a sulfur slurry, the sulfur particulates may be fed to mixer 220 to combine sulfur particulates 212 with carrier fluid 218. It is recognized that carrier fluid 218 may also be referred to as a base fluid herein. Mixer 220 may comprise any suitable apparatus for blending sulfur particulates 212 with carrier fluid 218. Examples of suitable devices for blending sulfur particulates 212 with carrier fluid 218, include, but are not limited to, mixing tees, mixing vessels, static mixers, centrifugal pumps, or any combination thereof. In certain embodiments, the carrier fluid comprises water. Any water source may be used including fresh water, sea water, waste water, salt water, formation water, or any combination thereof.

Pump 230 provides motive energy for transporting sulfur slurry 222 to subterranean formation 280. Pump 230 may comprise any pump suitable for displacing sulfur slurry 222, including positive displacement pumps, centrifugal pumps, any pump known in the art, or any combination thereof. In certain embodiments, pump 230 may function as a mixer obviating the need for optional mixer 220.

Optional additives or other chemical agents 228 such as surfactants and/or viscosifiers may be added before or at mixer 220 or before or at pump 230 as depicted in FIG. 1. Surfactants may be added to the sulfur slurry to overcome the hydrophobic nature of sulfur and/or to improve the physical properties of the sulfur slurry. One or more viscosifiers may be introduced to the sulfur slurry to enhance the rheology of the sulfur slurry as desired. Additionally, the slurry and/or base fluid may be heated to improve the rheological properties of the slurry such as yield point and viscosity. Certain embodiments of the slurry may have a viscosity of less than about 10 centipoise. In some cases, heating the slurry reduces the potential of the sulfur to precipitate under certain conditions.

Although sulfur slurry 222 may be directed to any subterranean formation, in certain embodiments, sulfur slurry 222 will be directed to a geologically stable and geologically isolated subterranean zone. In some cases, the micro-sized sulfur slurry diffuses throughout an unconsolidated sand formation by way of a dilation mechanism. The dilation mechanism is a rock failure mechanism when the stress state in the rock reaches a shear failure condition. The dilation mechanism creates additional pore space for storing the large amount of the injected slurry volumes. Weak geological formations such as unconsolidated sand formations are particularly suitable for slurry disposal. The dilation mechanism easily occurs in these formations because they have weak rock shear strength of low internal friction angle and low cohesion that are prone to rock shear failure under slurry injection conditions.

It is explicitly recognized that any of the elements and features of each of the devices described herein are capable of use with any of the other devices described herein with no limitation, including varying the order of the elements depicted in FIG. 1. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A sulfur disposal method for disposing of sulfur in an unconsolidated sand formation comprising the steps of:
    receiving sulfur;
    reducing the sulfur to sulfur particulates from about 1 to about 10 microns;
    preparing an aqueous sulfur slurry comprising a carrier fluid and the sulfur particulates, wherein the carrier fluid comprises water;
    disposing of the aqueous sulfur slurry downhole;
    introducing the aqueous sulfur slurry to the unconsolidated sand formation; and
    allowing the aqueous sulfur slurry to diffuse throughout the unconsolidated sand formation wherein the aqueous sulfur slurry occupies and permeates through the unconsolidated sand formation by way of a dilation mechanism;
    wherein the step of reducing the sulfur to sulfur particulates is by conversion of the molten sulfur to the sulfur particulates and comprises the steps of:
    introducing molten sulfur to a tower;
    atomizing the molten sulfur to form an atomized molten sulfur spray, allowing the atomized molten sulfur spray to descend in the tower;
    introducing a gas to the tower, allowing the gas to flow through the tower counterflow to the atomized molten sulfur spray;
    allowing the gas to intimately interface with the atomized molten sulfur spray and cool the atomized molten sulfur spray to form the sulfur particulates;
    allowing the sulfur particulates to descend the tower under the influence of gravity; and
    withdrawing the sulfur particulates from the tower to form a withdrawn sulfur powder; and
    forming a slurry by mixing the withdrawn sulfur powder with an aqueous slurry, wherein the aqueous slurry includes wastewater available from a hydrocarbon production site.

2. The method of claim 1 wherein the sulfur particulates are from about 1 micron to about 3 microns in diameter.

3. The method of claim 1 wherein the sulfur particulates are about 2 microns in diameter.

4. The method of claim 1 wherein the sulfur particulates have an average size from about 1 micron to about 10 microns.

5. The method of claim 1 wherein the step of preparing the aqueous sulfur slurry comprises forming the aqueous sulfur slurry at a loading rate of about 1 to about 6 pounds of sulfur particulates per gallon of carrier fluid.

6. The method of claim 1 wherein the water is seawater, freshwater, formation water, wastewater, or any combination thereof.

7. The method of claim 1 wherein the aqueous sulfur slurry further comprises a viscosifier.

8. The method of claim 1 wherein the step of reducing the sulfur to sulfur particulates comprises subjecting the sulfur to a colloidal mill to reduce the sulfur to the sulfur particulates.

9. The method of claim 1 wherein the step of reducing the sulfur to sulfur particulates comprises subjecting the sulfur to a prilling process to reduce the sulfur to the sulfur particulates.

10. The method of claim 1 wherein the step of introducing the molten sulfur comprises introducing the molten sulfur to the tower through a plurality of atomization nozzles and wherein the atomized molten sulfur spray comprises forming a mist of droplets from about 1 micron to about 10 microns.

11. The method of claim 1 further comprising forming a slurry from the withdrawn sulfur powder wherein the slurry comprises an aqueous slurry.

12. The method of claim 11 further comprising the step of introducing a surfactant in aqueous slurry.

13. The method of claim 12 further comprising the step of introducing a viscosifier to the aqueous slurry.

14. The method of claim 13 wherein the aqueous slurry has a viscosity of less than about 10 centipoise.

15. The method of claim 10 wherein the tower is a vertical tower; wherein the molten sulfur is introduced substantially at the top of the vertical tower.

16. The method of claim 14:
wherein the step of introducing the molten sulfur comprises introducing the molten sulfur to the tower through a plurality of atomization nozzles and wherein the atomized molten sulfur spray comprises forming a mist of droplets from about 1 micron to about 10 microns;
wherein the sulfur particulates have an average size from about 1 micron to about 10 microns; and
wherein the step of preparing the aqueous sulfur slurry comprises forming the aqueous sulfur slurry at a loading rate of about 1 to about 6 pounds of sulfur particulates per gallon of carrier fluid.

* * * * *